March 22, 1949.  A. M. DAVIS  2,464,923
REFRIGERATOR TRUCK

Filed March 11, 1946  2 Sheets-Sheet 1

INVENTOR.
Alva M. Davis
BY Harry G. Schwelb
attorney

March 22, 1949.  A. M. DAVIS  2,464,923
REFRIGERATOR TRUCK

Filed March 11, 1946  2 Sheets-Sheet 2

INVENTOR.
Alva M. Davis
BY
Harry Shrader
Attorney

Patented Mar. 22, 1949

2,464,923

UNITED STATES PATENT OFFICE 2,464,923

REFRIGERATOR TRUCK

Alva M. Davis, Monterey, Calif.

Application March 11, 1946, Serial No. 653,664

1 Claim. (Cl. 296—24)

This invention relates to refrigerator trucks, the main object being to arrange the parts of the truck in such a manner as to utilize the maximum area of the truck body for refrigeration purposes as compared with a conventional body of the same size.

A further object is to provide an entry and exit door arrangement which best protects the refrigeration area from exterior heat when produce is being taken into or removed from the truck.

Figure 1:
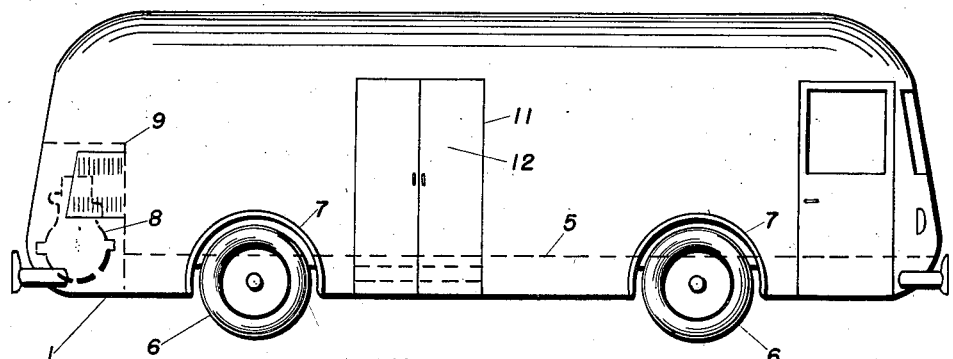
Figure 1 is a side elevation of a refrigerator truck constructed according to my invention.
Figure 2:
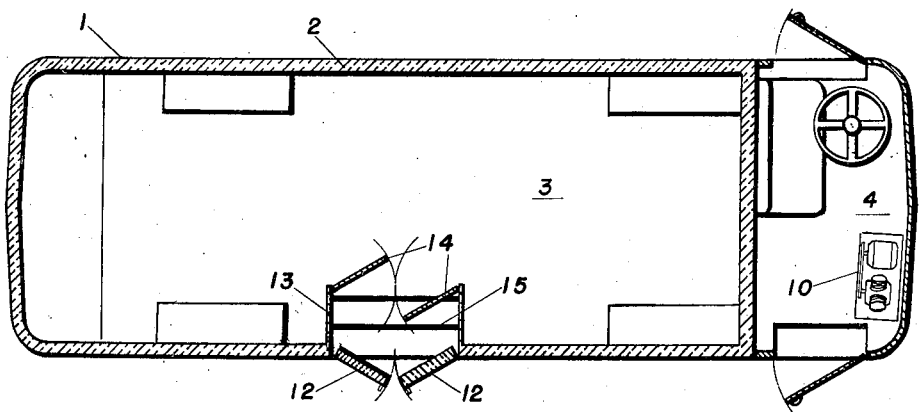
Figure 2 is a sectional plan of the same.

Referring to the numerals of reference on the drawings, and particularly at present to Figures 1 and 2, the truck 1, includes a body formed with insulated walls 2, defining the refrigeration compartment 3, and a driver's compartment 4, ahead of and separated from compartment 3.

Compartment 3, also includes a floor 5, disposed as close as practicable to the axle of the wheels 6, of the truck, said wheels being disposed laterally inward of the side walls 2, and being received in recessed housings 7, projecting into compartment 3, the necessary amount.

The engine 8 of the truck is mounted in a compartment 9, at the rear of the truck, while the refrigerating unit 10 is disposed in the driver's compartment 4.

Entry to compartment 3 is had by a side doorway 11, normally closed by outwardly opening insulation doors 12. The doorway is at the outer end of a vestibule 13, projecting into the compartment 3, and normally closed at its inner end by swing doors 14. A set of shallow steps 15, in the vestibule lead down from floor level at doors 14 to the doors 12, so as to place the first step as close to the ground as possible.

The side sheathing of the body extends down to the level of said first step and the lower edge of doors 12, as shown in Figure 1, so as to present a continuous and neat appearance.

With this arrangement it will be seen that a maximum refrigerating area is provided, while the double-door and vestibule tend to prevent entry of heat into, and escape of cold air from, the compartment when loading and unloading operations are being carried out.

Figure 3:
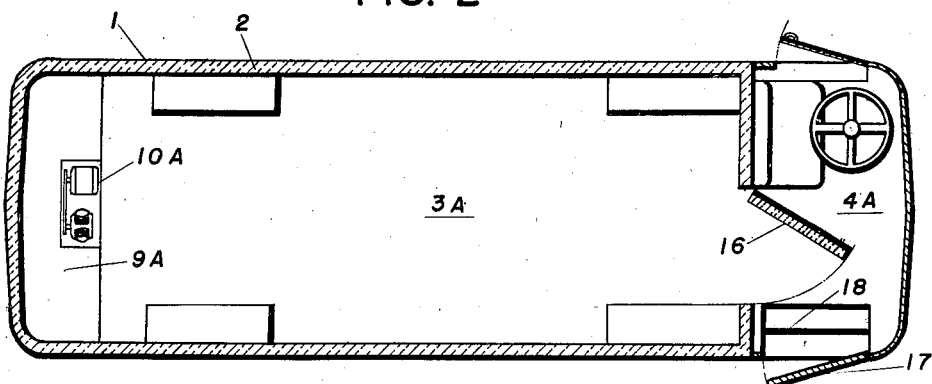
Figure 3 is a similar view showing a modified positioning of the door arrangement.

In the design shown in Figure 3, the construction is generally the same, but the entry door 16, directly into the compartment 3a opens into the driver's compartment 4a; the outer door 17, being at the foot of steps 18, leading to compartment 4a. The refrigerating unit 10a is in compartment 3a over engine compartment 9a.

Figure 4:
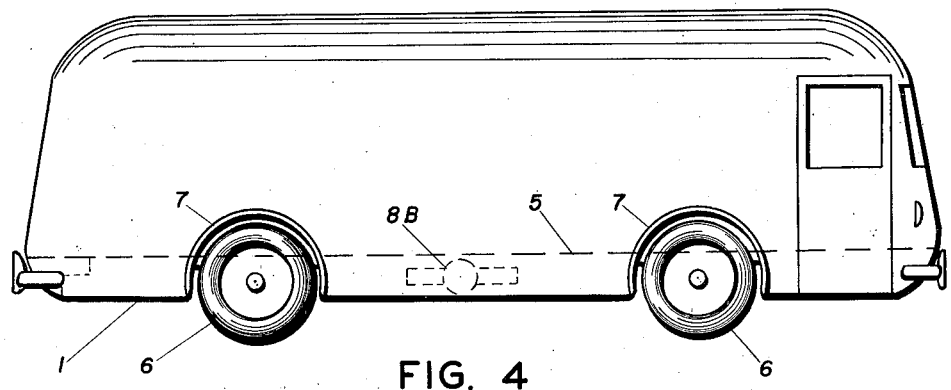
Figure 4 is a side elevation of a truck showing a further modified positioning of the door arrangement.
Figure 5:
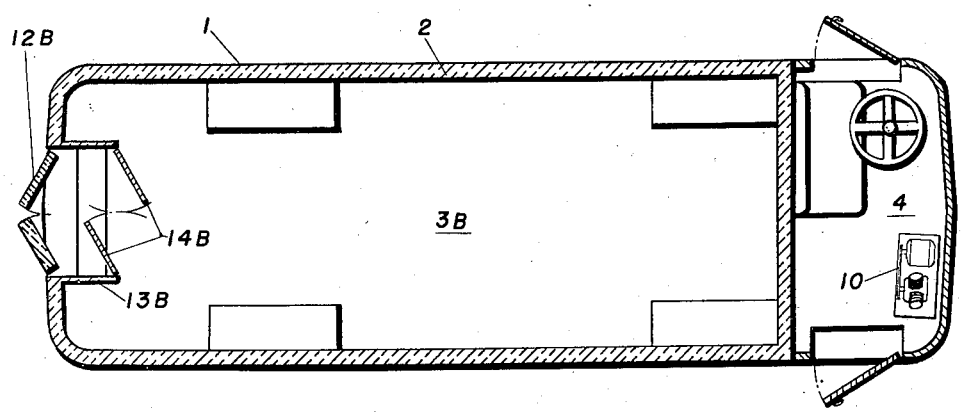
Figure 5 is a sectional plan of the same.

In Figures 4 and 5 the insulated and swing doors 12b and 14b, respectively are provided with the vestibule 13b at the rear end of compartment 3b. In this case, the truck engine 8b is under the floor and is of the horizontal opposed cylinder type as indicated in Figure 4.

I claim:

In a refrigerator truck, a body comprising a refrigeration compartment and including side walls, end walls, ceiling and floor, an entrance into said compartment arranged on one of the side walls thereof and consisting of a pair of outer insulated doors swinging outwardly, a vestibule back of said doors and projecting into said compartment, said vestibule being completely closed to form an air lock and having a few steps below the level of said floor, a pair of inner self-closing doors separating said vestibule and the refrigeration compartment and adapted to swing both ways.

ALVA M. DAVIS.

REFERENCES CITED

The following references are of record in the file of this patent:

UNITED STATES PATENTS

| Number | Name | Date |
|---|---|---|
| 1,894,014 | Wolf | Jan. 10, 1933 |
| 1,907,217 | Rott | May 2, 1933 |
| 1,966,164 | Clark | July 10, 1934 |
| 2,125,205 | Snowden | July 26, 1938 |
| 2,279,572 | Kann | Apr. 14, 1942 |

FOREIGN PATENTS

| Number | Country | Date |
|---|---|---|
| 464,387 | Great Britain | Apr. 16, 1937 |